United States Patent [19]
> Evans

[11] 4,199,231
[45] Apr. 22, 1980

[54] HYDROGEL CONTACT LENS

[76] Inventor: Carl H. Evans, 1732 Lawrence Ave. E., Scarborough, Ontario, Canada, M1R 2Y1

[21] Appl. No.: 934,714

[22] Filed: Aug. 21, 1978

[51] Int. Cl.² ............................................. G02C 7/04
[52] U.S. Cl. ............................... 351/160 H; 351/161
[58] Field of Search ............... 351/160 H, 160 R, 161

[56] References Cited

U.S. PATENT DOCUMENTS

| | | | |
|---|---|---|---|
| 3,660,545 | 5/1972 | Wichterle | 351/160 H X |
| 3,728,315 | 4/1973 | Gustafson | 351/160 H X |

OTHER PUBLICATIONS

Williams, B., "A New Hard Bifocal Lens Design," *Contacto* Sep. 1976, pp. 34–36.

Kaplan, M. M., "The Aplanatic Contact Lens," *Optometric Weekly*, vol. 58, No. 6, Feb. 9, 1967, pp. 25–29.

*Primary Examiner*—John K. Corbin
*Assistant Examiner*—Scott J. Sugarman
*Attorney, Agent, or Firm*—Diller, Ramik & Wight

[57] ABSTRACT

A soft contact lens provided with a front surface whose cross section describes the curve whose equation, in polar coordinates, is $\rho = R + kR(1-\cos\theta)/(1+\cos\theta)$ where R is the radius of curvature of a spherical lens of power equal at least approximately to the most hyperopic (or least myopic) power meridian of the ametropia plus about one-half of any presbyopic addition required by the patient, and k is a constant of eccentricity which may vary with the hydrophilic properties of the lens material and is determined for each material such that the visual acuity for distance and near vision is 20/20 or better with the aforesaid R value. The value of k lies within the range 0.005 to 0.1.

16 Claims, 2 Drawing Figures

HYDROGEL CONTACT LENS

BACKGROUND OF THE INVENTION

The present invention relates to a soft plastic contact lens which is most useful in correcting visual deficiencies in the eye and more particularly to a contact lens of an hydrophilic, soft ophthalmic plastic material commonly known as gel lens material which not only enhances visual resolution in presbyopic ametropia but also is effective in pre-presbyopic ametropia.

During the last twenty-five years hard contact lenses have become effective therapeutic devices for the treatment of ametropia with capabilities far in excess of regular ophthalmic lenses. Although their use as a cosmetic replacement for regular ophthalmic lenses is the primary reason for their increased utilisation, they are, in fact, more effective in the treatment of most cases of high ametropia, anisometropia and irregular astigmatism than conventional spectacles.

In recent years their use has significantly increased and a demand for their wider application is manifest, especially so among presbyopic patients who have been wearing contact lenses for the last twenty or more years. These patients are now at the age where they require supplemental lens power over and above their contact lens correction in order to maintain normal vision function at near distances in the order of 13–16 inches. Many types of bifocal contact lenses have been designed and fitted with extremely limited success and acceptance. The simplest solution has been the use of spectacles for near tasks in conjunction with continuing contact lens wear and, in many cases, this has led to the abandonment of both in favour of regular ophthalmic bifocal lenses, with their inherent limitations. Regular bifocal lenses are rather restrictive on head and eye movements and therefore their value is reduced in many occupations. Development of contact lenses useful for both near and far distances has been long sought after.

Soft, hydrophilic or hydrated gel, ophthalmic plastic materials have been developed within the last ten to fifteen years and these materials are being used for contact lenses but no really satisfactory multifocal contact lens of this soft material has so far been produced.

Spherical aberration in the eye has been reduced in recent years by the use of hard plastic spectacle lenses having a front aspheric surface, such as for example in the Bausch & Lomb, American Optical Company, and Orma (trade mark) aspheric acrylic spectacle bifocal lenses used mainly in aphakia therapy. They improve resolution but are similar to regular bifocal lenses. More recently such a construction has been used in the Panofocal (trade mark) hard contact lens for the correction of ocular astigmatism.

In the Wichterle U.S. Pat. Nos. 2,976,576; 3,361,858; 3,408,429; 3,496,254; 3,497,577 and 3,499,862 methods for cutting and producing hydrophilic soft contact lenses are disclosed. Furthermore, in the Seiderman U.S. Pat. No. 3,503,942 a hydrophilic plastic contact lens is disclosed of a specific composition. Soft contact lenses have been developed which are effective in correcting astigmatism in the prepresbyopic eye. They are of toroidal but not aspheric design. However, in none of these patents is a soft contact lens disclosed, fitted to the wearer, which alleviates presbyopic ametropia.

BRIEF SUMMARY OF THE INVENTION

A soft, flexible, hydrophilic contact lens configuration has now been discovered which is effective in correcting vision for near and intermediate distances and for infinity.

The invention is directed to a novel hydrophilic contact lens having a special aspheric outer surface in which the radius of curvature, expressed in polar coordinates is $\rho = R + kR(1-\cos\theta)/(1+\cos\theta)$. The value of R is determined by the patient's ametropia and, for the presbyopic patient, additionally by the amount of presbyopic addition. For the prepresbyopic patient, the value of R is determined to provide correction for the most hyperopic (or least myopic) power meridian of the ametropia. For the presbyopic patient, the value of R is determined to provide the power necessary to correct the most hyperopic (or least myopic) power meridian of the ametropia, as above, plus approximately one-half of the presbyopic addition of the patient.

The k value, on the other hand, is primarily a function of the hydrophilic lens material and is determined empirically within the range 0.005 to 0.1. However, in fitting a patient, slight change in the empirical k value may be required in order to achieve equal (20/20 or better) acuity for distance and near vision.

It is an object of the present invention to produce a novel hydrated gel contact lens, fitted to the wearer, which alleviates presbyopia and simultaneously corrects the ametropia while providing heretofore unreached new levels of ocular compatability and patient acceptance.

Another object of the invention is to produce a novel hydrated gel contact lens which effectively alleviates astigmatism for the prepresbyopic as well as the presbyopic patient.

Other objects and advantages of the invention will be apparent from the following description taken in conjunction with the accompanying drawings in which:

BRIEF DESCRIPTION OF THE DRAWING FIGURES

FIG. 1 is a diagrammatic representation of a lens embodying the invention located on a wearer, and FIG. 2 is a diagrammatic representation of the tracing of light rays through a lens embodying the invention and fitted on a wearer.

DETAILED DESCRIPTION OF THE INVENTION

Figure 1:
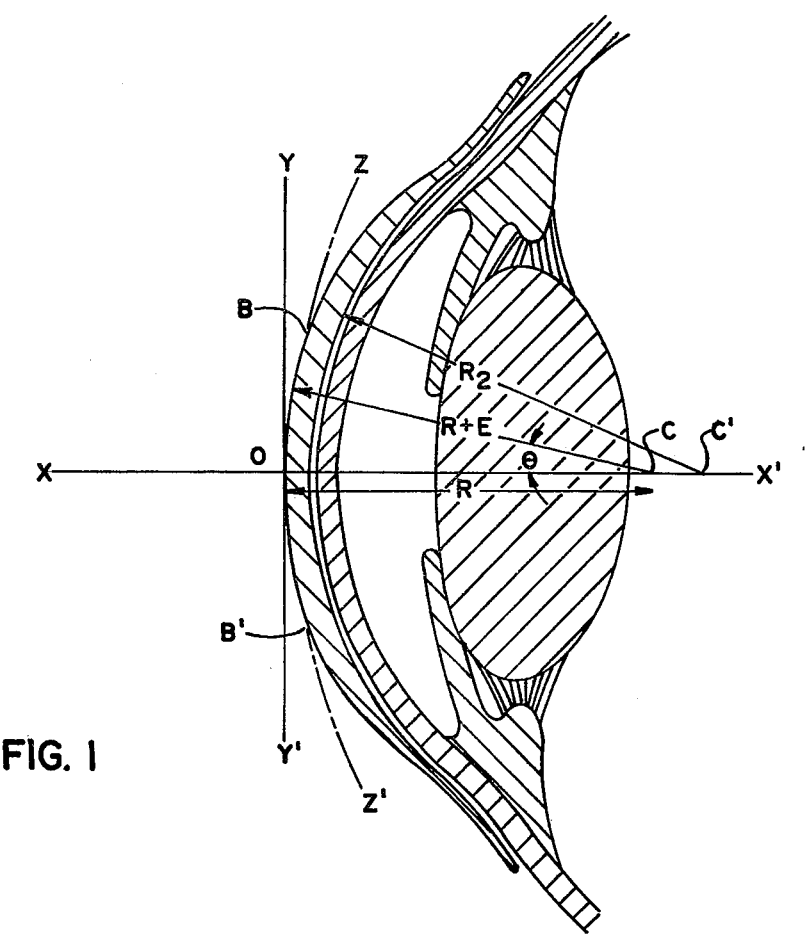

The contact lens of this invention, as fitted to a wearer, is fabricated of an hydrophilic, soft, pliable, opthalmic plastic and it has an aspheric convex outer surface of special configuration. The optic zone or aperture of the lens in the dehydrated state extends over an angle $2\theta$ of about 70°. The aspheric surface is defined by the equation $\rho = R + E'$ where R is the radius of curvature at the center of the lens, and $E'$ is an asphericity term $kE$ where $E = R(1-\cos\theta)/(1+\cos\theta)$ and k is an eccentricity constant chosen within the range 0.005 to 0.1.

In polar coordinates, then, the equation for the center surface of the lens is $\rho = R + kR(1-\cos\theta)/(1+\cos\theta)$, from which it will be evident that when k=0 the surface is spherical whereas when k=1 the surface is a parabaloid. The k value range of this invention (k=0.005 to 0.1) results in an ellipsoidal surface near that limit (k=0) where the surface is spherical.

The lens elminates most of the disadvantages inherent in spectacle multi-focals and provides better intermediate resolution in a continuum from infinity to within 13-16 inches, without the zonal restrictions in spectacle multi-focals.

The value of the radius of curvature R is determined to provide approximately that power necessary to correct for the most hyperopic (or least myopic) power meridian of the ametropia of the wearer. In the case of a prepresbyopic patient, the R value is thus fully determined whereas, for the presbyopic patient, the power is increased by approximately one-half of the presbyopic addition. Stated otherwise, the value of R is determined by the most hyperopic (or least myopic) power meridian of the ametropia plus approximately one-half the presbyopic addition of the wearer, if applicable.

The value of k is determined empirically but may require modification if, through trial and error, it is determined that the wearer requires such modification in order to achieve equality (20/20 or better) of near and distance acuity.

The empirical determination of k is based upon the physical properties of the lens material, specifically the flexibility of the material which is related to the water content or swell factor of the material. The presently preferred lens material employed in the Examples hereinafter is Toyo 515, manufactured by the Toyo Contact Lens Company of Nagoya, Japan. This material is hydrated gel produced from a monomethyl methacrylate material which is cross-linked to absorb water and lacrimal fluids. The swell ratio of this material is 1.2 and the water content is about 35% when equilibriated in 0.7% saline solution at 35° C., and the empirically derived k value for this material is 0.015.

Currently, lens manufacturers provide materials in which the equilibriated water content may range from about 20% to about 80%. The empirically derived k value will be found to vary for specific materials dependent upon their relative flexibilities, the k value decreasing as the flexibility increases, and vice versa and to lie within the range 0.005–0.1.

Using the R and k values determined as above, the lenses are prepared and fitted to the patient and the distance and near visual acuities are determined. In many cases, the distance and near vision will be found to be acceptable (i.e., 20/20 or better at infinity and within 13 to 16 inches) with normal binocularity. However, if the visual acuity test indicates the need for a change in correction for ametropia, the required change may be determined by adding positive or negative spherical trial lenses in front of the existing contact lenses, in plus or minus steps of 0.25 D to achieve 20/20 or better acuity at distance and near. If the requisite near and distance acuity can be achieved in this fashion, new lenses are prepared with the corresponding change in R value to provide the indicated power change. However, if one of the near and distance acuities cannot be achieved in this fashion, a change in k value is indicated. The k value is then varied in plus or minus steps of 0.001 until 20/20 or better acuity both at near and distance is achieved, an increasing (+) step being employed if the difficulty arises with distance acuity or a decreasing (−) step being employed if the difficulty is with the near acuity, until the 20/20 or better visual acuity is achieved for both distance and near.

The lens of the invention is fitted to the cornea as snuggly as is physiologically possible to achieve a homocentric system with a minimum of lens displacement. For this purpose, the usual techniques are employed. That is, the back surface of the lens is zero to five dioptres flatter than the corneal K readings of the wearer varying with the overall lens diameter of 10 to 15 mm. The back surface is most commonly spherical. The aspheric optic zone in the lens is usually 70° in diameter in its dehydrated state.

It is essential that an aspheric surface maintain constant homocentricity in order to effectively reduce the spherical aberration of the system.

Although some displacement is mandatory in the maintenance of physiological propriety, it is essential that the lens return to center after each blink. This is readily achieved with the hydrophilic gel contact lenses but it was not physiologically possible with the previous hydrophobic plastic— which in fact required significant mobility for an optimum fit and thus could not provide the essential element of a properly centered system.

Referring to FIG. 1 of the drawing, a diagrammatic representation of the contact lens of the present invention in situ is shown. The aspheric surface of the front of the lens is represented by the optic zone BB' of the curve ZBB'Z'. The inner surface of the lens is usually spherical, having a radius of curvature $R_2$ centered at C'. The actual front aspheric optic zone BB'; is usually 70° in diameter in its dehydrated state. The lens is tapered arcuately inward to its outer ends from the points B and B' on the aspheric curve.

Figure 2:
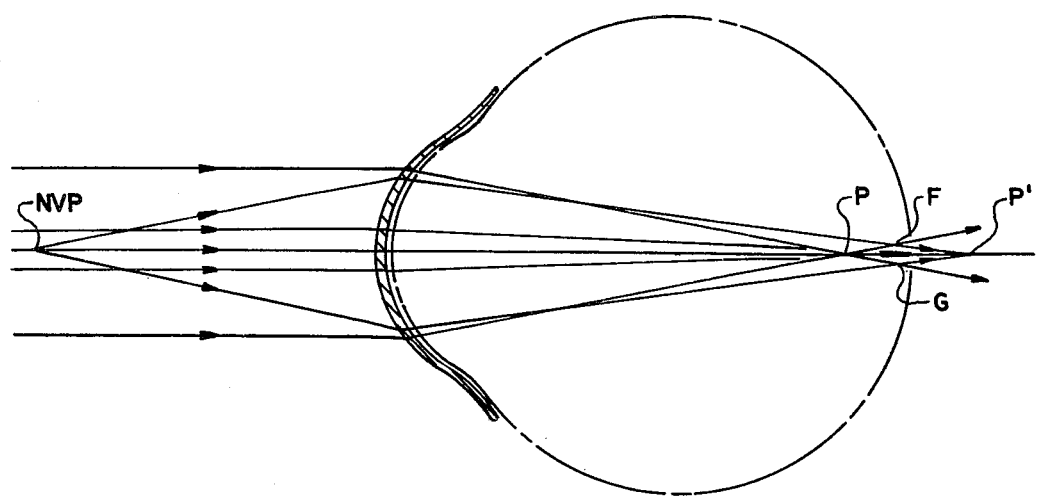

Referring to FIG. 2 of the drawings, a diagrammatic representation of ray tracing with the lens in situ is shown.

NVP is the near visual point (usually in the order of 13–16 inches). FIG. 2 demonstrates the effect of the aspheric curve on peripheral rays from infinity, which, although focussing at P in front of the retina, create a blur circle on the retina of diameter FG, which approximates in size the blur circle formed by the rays from the NVP which focus at P' behind the retina. With the spherical aberration of the system reduced to an absolute minimum, this blur circle falls well within minimum resolvable limits of the eye so that normal acuity is maintained continuously from infinity to the NVP. It can be appreciated that the blur circle FG is greatly exaggerated in size for diagrammatic purposes. The paraxial rays are shown to focus within the blur circle FG.

Similarly, when the astigmatism is less than 3.0 D, the linear foci can be shown to fall between PP' and create blur circles which fall within FG, the minimum resolvable limits of the eye.

As noted above, the presently preferred material of this invention is Toyo 515, for which the empirical k value is 0.015. However, other and different commercially available materials may be used, as for example, hydrated gel lenses may contain the following materials:

Hydroxyethylmethacrylate (HEMA) or its analogues
Ethyleneglycoldimethacrylate (EGMA) or its analogues
Polymethylmethacrylate (PMMA) or its analogues
Polyvinylpyrrolidone (PVP)
Traces of the respective monomers
Traces of inhibitors such as hydroquinone
Traces of catalysts such as benzoyl peroxide The lens is lathe cut and polished in its dehydrated state in the usual manner except for its front surface which is aspheric (portion BB' in FIG. 1), which is generated by substituting the radius value R of the front power curve (as predetermined by the distance and near prescription requirements of the patient) and selecting an R and k value to achieve the requisite visual acuity, as described above.

When applied to the eye according to accepted fitting principles for hydrophilic lenses, i.e., the back surface of the lens is of sufficiently longer radius than the corneal K readings so as to achieve a comfortable fit, usually between 1 to 5 dioptres flatter and increasing with increased lens diameter, the correcting lens reduces the total spherical aberration of the eye and lens system to a level which equates the distance focus blur circles on the retina to the near-focus blur circles and effectively reduces these blur circles to within acceptably resolvable levels (as illustrated by FIG. 2) and thus neutralizes the astigmatism and/or presbyopia. It is similarly effective in aphakia with a reasonably functional pupil.

The present contact lens uses a novel combination of the new soft lens material and a carefully designed aspheric front surface to achieve a level of visual resolution never before possible with this type of lens. The difference between the contact lens effect of a hard lens as opposed to a soft lens lies in the nature of the fitting procedures, with a less stably centered eye and lens system being produced with a hard lens compared with a more stably centered system for a soft lens. The hard lens, because of its higher wetting angle (more hydrophobic or less hydrophilic), must be fitted to the eye so that it does not unduly restrict tear flow and interfere with corneal metabolism. This is accomplished by fitting the hard lens so that it enjoys lateral (both vertical and horizontal) movement and rotation. Since the hard lens is usually spherical, the instability of the centricity of the system has little detrimental visual effect. This hard lens replaces the aspheric front corneal surface with a spherical surface.

On the other hand, an aspheric front curve lens is most effective in a stably centered system and this ability to remain centered is best achieved with the soft material which virtually "glues" itself to the eye and, because of its very low wetting angle (very hydrophilic), it much less disturbing to the corneal metabolism. The lens of this invention in effect eliminates the front surface of the cornea, assumes the existing corneal shape and thus increases the resultant asphericity to produce a most effective optical system for reducing spherical aberration in the eye.

The first patient successfully fitted with a lens of this invention was a simple myopic presbyope but the lens has since proven effective in treating both myopic and hyperopic astigmats with presbyopia, aphakia, and astigmatism in prepresbyopia.

Example 1

Patient A, age 44 years, had the following spectacle prescription:
O.U. −2.25 D sph., presbyopic addition +1.50 D
K-readings:
O.D. 41.25×180°/41.62×90°
O.S. 41.25×180°/41.62×90°

Contact lenses of Toyo 515 material were made for this patient. The index of refraction of this material, in the hydrated state, is 1.443, the center thickness of the lens material was 0.18 mm and the radius $R_2$ of the back surface was 8.82 mm (50.23 D). The resultant lens power at the center of the lens was, as described above, −2.25+ 1.50/2 =1.50 D and this was achieved by employing an R value equal to 9.15 mm (48.39 D). The optic zone was 12.6 mm in diameter and the lens had an overall diameter of 14.0 mm.

Patient A achieved a visual acuity of 20/20 at 14 inches and at all intermediate to infinity distances with normal binocularity. Since the most hyperopic power meridian was used to establish R, astigmatism would also be corrected.

Example 2

Patient B, age 47 years, had the following spectacle prescription:
O.U. +2.00 D sph. presbyopic addition +1.50 D.
K-readings:
O.D. 43.62×180°/43.62×90°
O.S. 43.62×180°/43.62×90°

Contact lenses of the same material specified in Example 1 were made for this patient, the center thickness being 0.40 mm and the radius $R_2$ being 8.52 mm (52.00 D). The resultant lens power at the center of the lens was +2.00+1.50/2= +2.75 D which required an R value of 8.21 mm (53.97 D) with k=0.015 as in Example 1. The aspheric optic zone was 11.3 mm in diameter with an overall lens diameter of 14.0 mm.

Patient B achieved a visual acuity of 20/20 at 16 inches and at all intermediate distances to infinity with normal binocularity.

Example 3

Patient C, aged 30 years, had the following spectacle prescription:
O.D. +4.00 D sph.  −2.25×10°
O.S. +4.00 D sph.  −2.25×180°
K-readings:
O.D. 39.37×15°/41.87×105°
O.S. 38.75×180°/41.12×90°

Contact lenses of the same material as specified in Examples 1 and 2 were made for patient C, the center thickness being 0.45 mm for each lens and the radii $R_2$ being (O.D.) 9.28 mm (47.74 D) and (O.S.) 9.44 mm (46.93 D). The k value was 0.015 for each lens. Since the radii $R_2$ were different, the requisite R values to achieve the +4.00 D correction (zero presbyopic addition) were (O.D.) 8.69 mm (50.98 D) and (O.S.) 8.82 mm (50.23 D). For O.D., the aspheric zone was 12.0 mm with overall diameter of 15.0 mm whereas for O.S., the aspheric zone was 12.1 mm with overall diameter of 15.0 mm.

Patient C achieved 20/20 visual acuity from infinity to within 12 inches with normal binocularity.

As described, the R value is determined in the first instance by the spectacle prescription and in the majority of cases will not require modification unless difficulty is experienced in achieving 20/20, or better, visual acuity both for distance and near vision. Likewise, the k value is determined by the flexibility of the lens material in the hydrated state and will not normally be altered unless difficulty is experienced with the near and distance acuity which cannot be corrected by modification of R, as described above. As noted, the k value depends upon the material used and must be determined empirically. The correct empirical value will be that which, for the majority of patients, will achieve at least 20/20 near and distance acuity either with the value of R derived from the spectacle prescription or as modified by + or − spherical power as achieves the requisite near and distance acuity, as described above. Although an exact k value cannot be assigned to all materials which currently are or may be manufactured, the empirical k value is determined by the flexibility of the lens material as noted above and is related in general inversely to the equilibrated water content (or swell ratio) although not in a direct linear fashion. Thus, for materials in the upper range of equilibrated water content, the k values will tend toward the lower value of 0.005 whereas the materials of lower equilibrated water content will tend toward the upper value of 0.1.

What is claimed is:

1. A contact lens of hydrophilic, soft, pliable gel ophthalmic plastic material, said lens having a back surface conforming to the corneal surface of the wearer's eye and having an ellipsoidal front surface providing an aspheric optic zone which is a surface of revolution of the curve $\rho = R + kR(1-\cos\theta)/(1+\cos\theta)$ where R is the radius of curvature of a spherical lens whose power is approximately equal to the most hyperopic or least myopic power meridian of the wearer's ametropia plus about one-half of any presbyopic addition required by the wearer, and k is a constant of eccentricity which is within the range of 0.005 to 0.1, said R and k values being such that the visual acuity of the wearer is 20/20 or better both for distance and near vision.

2. A contact lens as defined in claim 1 wherein said value of k is in the order of 0.015 and the lens material has an equilibrated water content of about 35% and a swell ratio of about 1.2.

3. A contact lens of hydrophilic, soft, pliable gel ophthalmic plastic material, said lens having a back surface conforming to the corneal surface of the wearer's eye and having an ellipsoidal front surface providing an aspheric optic zone which is a surface of revolution of the curve $\rho = R + kR(1-\cos\theta)/(1+\cos\theta)$ where k lies within the range 0.005 to 0.1 and k and R are so related that the lens corrects the wearer's ametropia while providing visual acuity of at least 20/20 for near and distance vision.

4. A contact lens as defined in claim 3 wherein said value of k is in the order of 0.015 and the lens material has an equilibrated water content of about 35% and a swell ratio of about 1.2.

5. A contact lens of hydrophilic, soft, pliable gel ophthalmic plastic material, said lens having a back surface conforming to the corneal surface of the wearer's eye and having a front surface providing an aspheric optic zone which is an ellipsoidal surface of revolution of the curve $\rho = R + kR(1+\cos\theta)/(1+\cos\theta)$ where R is the radius of curvature of a spherical lens whose power is approximately equal to the most hyperopic or least myopic power meridian of the wearer's ametropia plus about one-half of any presbyopic addition required by the wearer, and k is a constant of eccentricity dependent upon the hydrophilic properties of the lens material and which has a nominal value of 0.015 for a lens material having an equilibrated water content of about 35% and a swelling ratio of about 1.2.

6. The method of making hydrophilic soft contact lenses for enhancing visual acuity of a presbyopic patient which comprises the steps of:
(a) determining the power of ametropia of the patent;
(b) determining the power of presbyopic addition required by the patient; and
(c) forming contact lenses having an ellipsoidal front surface whose cross section defines a curve expressed in polar coordinates by the equation $\rho = R + kR(1-\cos\theta)/(1+\cos\theta)$ where R is determined by the power of the lens which is approximately equal to the power determined in step (a) plus about half the power determined in step (b)

and K is selected from the range k=0.005 to 0.1 dependent upon the hydrophilic properties of the lens material.

7. The material as defined in claim 6 wherein k is about 0.015 when the lens material has an equilibrated water content of about 35% and a swelling ratio of about 1.2.

8. The method according to claim 6 including the additional steps of (d) checking the visual acuity of the wearer as fitted with the lenses to determine whether both near and distance vision is at least 20/20, (e) modifying the value of R and, if necessary, the value of k if the test of step (d) reveals inadequate visual acuity, (f) forming new lens according to the modifications of step (e), and repeating steps (d), (e) and (f) as necessary to achieve the visual acuity specified in step (d).

9. The method as defined in claim 8 wherein k is about 0.015 when the lens material has an equilibrated water content of about 35% and a swelling ration of about 1.2.

10. Contact lenses formed by the method of claim 6.

11. The method of making hydrophilic, soft contact lenses for a prepresbyopic patient afflicted with astigmatism, which comprises the steps of: p1 (a) determining the power of the most hyperopic or least myopic meridian value of the patient; and (b) forming contact lenses having an ellipsoidal front surface whose cross section defines a curve expressed in polar coordinates by the equation $\rho = R + kR(1+\cos\theta)/(1+\cos\theta)$ where R is the radius of curvature of a spherical lens whose power is approximately equal to that determined in step (a) and k is selected from the range k=0.005 to 0.1 dependent upon the hydrophilic properties of the lens material.

12. The method as defined in claim 11 wherein k is about 0.015 when the lens material has an equilibrated water content of about 35% and a swelling ratio of about 1.2.

13. The method according to claim 11 including the additional steps of (d) checking the visual acuity of the wearer as fitted with the lenses to determine whether both near and distance vision is at least 20/20, (e) modifying the value of R and, if necessary, the value of k if the test of step (d) reveals inadequate visual acuity, (f) forming new lens according to the modifications of step (e), and repeating steps (d), (e) and (f) as necessary to achieve the visual acuity specified in step (d).

14. The method as defined in claim 13 wherein k is about 0.015 when the lens material has an equilibrated water content of about 35% and a swelling ratio of about 1.2.

15. Contact lenses formed by the method of claim 11.

16. A contact lens of hydrophilic, soft, pliable gel opthalmic plastic material, said lens having a back surface conforming to the corneal surface of the wearer's eye and having an ellipsoidal front surface providing an optic zone which is a surface of revolution of the curve $\rho = R + kR(1-\cos\theta)/(1+\cos\theta)$ where R is the radius of curvature of a spherical lens of power approximately equal to the most hyperopic or least myopic power meridian of the wearer's ametropia plus about one-half of any presbyopic addition required by the wearer, and k is a constant of eccentricity dependent upon the hydrophilic properties of the lens material and is determined for such lens material such that the visual acuity for distance and near vision is 20/20 or better with said value of R.

* * * * *